(12) United States Patent
Ren

(10) Patent No.: US 10,532,434 B2
(45) Date of Patent: Jan. 14, 2020

(54) BRAZING SHEET

(71) Applicant: ALCOA INC., Pittsburgh, PA (US)

(72) Inventor: Baolute Ren, Lititz, PA (US)

(73) Assignee: ARCONIC INC., Pittsburgh, PA (US)

(*) Notice: Subject to any disclaimer, the term of this patent is extended or adjusted under 35 U.S.C. 154(b) by 191 days.

(21) Appl. No.: 14/882,046

(22) Filed: Oct. 13, 2015

(65) Prior Publication Data

US 2016/0101488 A1 Apr. 14, 2016

Related U.S. Application Data

(60) Provisional application No. 62/063,267, filed on Oct. 13, 2014.

(51) Int. Cl.

| | |
|---|---|
| *B23K 35/02* | (2006.01) |
| *B23K 35/28* | (2006.01) |
| *C22C 21/02* | (2006.01) |
| *C22C 21/10* | (2006.01) |
| *C22C 21/14* | (2006.01) |
| *C22C 21/16* | (2006.01) |
| *C22C 21/18* | (2006.01) |
| *B32B 15/01* | (2006.01) |

(52) U.S. Cl.
CPC ........ *B23K 35/288* (2013.01); *B23K 35/0238* (2013.01); *B32B 15/016* (2013.01); *B32B 15/017* (2013.01); *C22C 21/02* (2013.01); *C22C 21/10* (2013.01); *C22C 21/14* (2013.01); *C22C 21/16* (2013.01); *C22C 21/18* (2013.01); *Y10T 428/12764* (2015.01)

(58) Field of Classification Search
None
See application file for complete search history.

(56) References Cited

U.S. PATENT DOCUMENTS

| | | | |
|---|---|---|---|
| 6,291,792 B1 | 9/2001 | Fussnegger et al. | |
| 7,018,722 B2 * | 3/2006 | Toyama | B32B 15/016 165/905 |

(Continued)

FOREIGN PATENT DOCUMENTS

| | | |
|---|---|---|
| DE | 10 2007 036416 A1 | 2/2009 |
| DE | 102009055608 A1 | 5/2011 |

(Continued)

OTHER PUBLICATIONS

International Search Report dated Apr. 19, 2016, which issued in corresponding International Application No. PCT/US2015/055287.

(Continued)

*Primary Examiner* — Daniel J. Schleis
(74) *Attorney, Agent, or Firm* — Greenberg Traurig, LLP

(57) ABSTRACT

In one embodiment, a brazing sheet comprises: a core layer, a braze liner on the first side of the core layer; and a waterside liner on the second side of the core layer. The core layer is comprised of a 3xxx series aluminum alloy. The waterside liner is an aluminum alloy comprising: 7-20 wt % Zn; up to 0.25 wt % Si; up to 0.1 wt % Cu; up to 0.25 wt % Mn; up to 0.1 wt % Mg; and up to 0.1 wt % Cr. In some embodiments, the brazing sheet has a thickness of 60-180 microns. In some embodiments, the waterside liner comprises 1-15% of the thickness of the brazing sheet.

14 Claims, 22 Drawing Sheets

(56) References Cited

U.S. PATENT DOCUMENTS

| | | | |
|---|---|---|---|
| 8,343,635 B2 * | 1/2013 | Matsumoto | B23K 1/0012 |
| | | | 148/535 |
| 2010/0183897 A1 * | 7/2010 | Kobayashi | B23K 35/0238 |
| | | | 428/654 |
| 2012/0292001 A1 * | 11/2012 | Traub | B23K 1/0012 |
| | | | 165/133 |

FOREIGN PATENT DOCUMENTS

| | | |
|---|---|---|
| EP | 0865860 A1 | 9/1998 |
| EP | 1090745 A1 | 4/2001 |
| JP | H10265881 A | 10/1998 |
| JP | H11209837 * | 8/1999 |
| JP | H11209837 A | 8/1999 |
| JP | 11-315335 | 11/1999 |
| JP | 2000-87164 | 3/2000 |
| JP | 2000087162 A | 3/2000 |
| JP | 2000-144290 | 5/2000 |
| JP | 2001274271 A | 10/2001 |
| JP | 2003293060 A | 10/2003 |
| JP | 2005-161352 | 6/2005 |
| JP | 2010-168622 | 8/2010 |
| JP | 2010-207898 A | 9/2010 |
| JP | 2011-086933 | 7/2011 |
| JP | 2012204692 A | 10/2012 |

OTHER PUBLICATIONS

Written Opinion of the International Searching Authority dated Apr. 19, 2016, which issued in corresponding International Application No. PCT/US2015/055287.

Third Party Observation received by the International Bureau dated May 11, 2016 in relation to International Patent Application No. PCT/US2015/055287.

* cited by examiner

| Sample # | Tube Thickness (μ) | Waterside Liner | | Zn% (Initial) | Solidus (°C) | Zn% (Product) | Solidus (°C) | Zn% (Post Braze Liner Surface) | Zn% (Post Braze Center of Brazing Sheet) | Delta (Between Liner Surface and Tube Center) |
|---|---|---|---|---|---|---|---|---|---|---|
| | | % | μ | | | | | | | |
| 1 | 150 | 20 | 30 | 4.6 | 624 | 4.357 | 625 | 2.863 | 0.497 | 2.366 |
| 2 | 150 | 10 | 15 | 12 | 597 | 8.179 | 608 | 4.186 | 0.518 | 3.668 |
| 3 | 150 | 7.5 | 11.25 | 16 | 575 | 8.735 | 606 | 4.250 | 0.497 | 3.753 |
| 4 | 150 | 1 | 1.5 | 99.5 | 420 | 11.345 | 600 | 5.147 | 0.550 | 4.597 |

BRAZING SHEET

CROSS REFERENCE TO RELATED APPLICATIONS

This application claims priority to U.S. Provisional Patent Application Ser. No. 62/063,267 filed Oct. 13, 2014, which is incorporated herein by reference in its entirety.

BACKGROUND

Heat exchangers, such as radiators and heater cores, are used for thermal energy transfer from an operating system, such as an automotive engine, to the environment. Coolant or cooling fluid is used as a medium to bring the heat from the operating system to the heat exchanger. Depending upon the chemical additives, a coolant can cause corrosion on the aluminum tube used for the heat exchanger. Therefore brazing sheet products for this type of heat exchanger applications, such as tubestock or header plate, have a liner on the coolant side, called waterside liner, which provides corrosion protection to the core of the aluminum tube.

SUMMARY

In one embodiment, a brazing sheet comprises: a core layer, a braze liner on the first side of the core layer; and a waterside liner on the second side of the core layer. The core layer is comprised of a 3xxx series aluminum alloy. The waterside liner is an aluminum alloy comprising: 7-20 wt % Zn; up to 0.25 wt % Si; up to 0.1 wt % Cu; up to 0.25 wt % Mn; up to 0.1 wt % Mg; and up to 0.1 wt % Cr.

In some embodiments, the waterside liner comprises: 7-20 wt % Zn; up to 0.25 wt % Si; up to 0.1 wt % Cu; up to 0.25 wt % Mn; up to 0.1 wt % Mg; and up to 0.1 wt % Cr, the remainder being aluminum, incidental elements and impurities.

In some embodiments, the waterside liner comprises 10-20 wt % Zn. In some embodiments, the waterside liner comprises 12-20 wt % Zn. In some embodiments, the waterside liner comprises 15-20 wt % Zn. In some embodiments, the waterside liner comprises 16-20 wt % Zn. In some embodiments, the waterside liner comprises 9-12 wt % Zn.

In some embodiments, the core layer comprises: 0.5-1.25 wt % Si; 0.5-1.25 wt % Cu; 0.5-2.0 wt % Mn; up to 0.15 wt % Mg; up to 0.1 wt % Cr; up to 0.1 wt % Zn; and 0.1-0.2 wt % Ti.

In some embodiments, the core layer comprises: 0.5-1.25 wt % Si; 0.5-1.25 wt % Cu; 0.5-2.0 wt % Mn; up to 0.15 wt % Mg; up to 0.1 wt % Cr; up to 0.1 wt % Zn; and 0.1-0.2 wt % Ti, the remainder being aluminum, incidental elements and impurities.

In some embodiments, the braze liner comprises a 4xxx series aluminum alloy.

In some embodiments, the brazing sheet has a thickness of 60-180 microns. In some embodiments, the brazing sheet has a thickness of 60-150 microns. In some embodiments, the brazing sheet has a thickness of 80-150 microns. In some embodiments, the brazing sheet has a thickness of 60-100 microns. In some embodiments, the brazing sheet has a thickness of 60-180 microns.

In some embodiments, the brazing sheet has a thickness and the waterside liner comprises 1-15% of the thickness. In some embodiments, the brazing sheet has a thickness and the waterside liner comprises 7-15% of the thickness. In some embodiments, the brazing sheet has a thickness and the waterside liner comprises 7-10% of the thickness. In some embodiments, the brazing sheet has a thickness and the waterside liner comprises 5-15% of the thickness. In some embodiments, the brazing sheet has a thickness and the waterside liner comprises 5-10% of the thickness.

In one embodiment, a brazing sheet comprises: a core layer, a braze liner on the first side of the core layer; and a layer of zinc on the second side of the core layer. The core layer comprises a 3xxx series aluminum alloy.

In some embodiments, the layer of zinc comprises 99.9 wt % Zn.

In some embodiments, the brazing sheet has a thickness and the layer of zinc comprises less than 2% of the thickness.

In some embodiments, the core layer comprises: 0.5-1.25 wt % Si; 0.5-1.25 wt % Cu; 0.5-2.0 wt % Mn; up to 0.15 wt % Mg; up to 0.1 wt % Cr; up to 0.1 wt % Zn; and 0.1-0.2 wt % Ti.

In some embodiments, the core layer comprises: 0.5-1.25 wt % Si; 0.5-1.25 wt % Cu; 0.5-2.0 wt % Mn; up to 0.15 wt % Mg; up to 0.1 wt % Cr; up to 0.1 wt % Zn; and 0.1-0.2 wt % Ti, the remainder being aluminum, incidental elements and impurities.

In some embodiments, the brazing sheet has a thickness of 60-180 microns. In some embodiments, the brazing sheet has a thickness of 60-150 microns. In some embodiments, the brazing sheet has a thickness of 80-150 microns. In some embodiments, the brazing sheet has a thickness of 60-100 microns. In some embodiments, the brazing sheet has a thickness of 60-180 microns.

It will be appreciated by those of ordinary skill in the art that the brazing sheet disclosed can be embodied in other specific forms without departing from the spirit or essential character thereof. The presently disclosed embodiments are therefore considered in all respects to be illustrative and not restrictive. Reference is now made to the accompanying drawings, which at least assist in illustrating various pertinent features of the disclosure.

BRIEF DESCRIPTION OF THE DRAWINGS

FIG. 13 is a chart showing the differences in zinc levels between the liner surfaces and cores of the embodiments referenced in FIGS. 5-12.

DESCRIPTION

It will be appreciated by those of ordinary skill in the art that the disclosed brazing sheet can be embodied in other specific forms without departing from the spirit or essential character thereof. The presently disclosed embodiments are therefore considered in all respects to be illustrative and not restrictive. Reference is now made to the accompanying drawings, which at least assist in illustrating various pertinent features of the disclosure.

Figure 1:
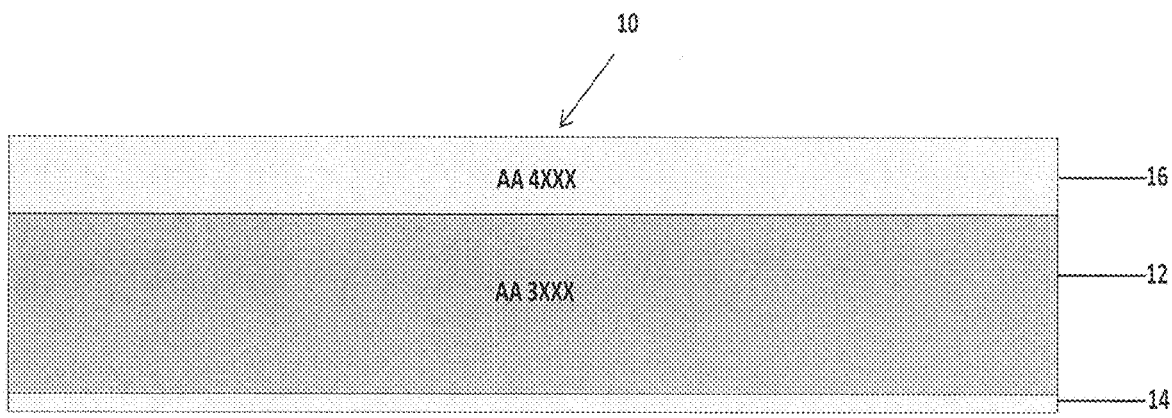
FIG. 1 is a schematic cross-section view of one embodiment of a brazing sheet.

FIG. 1 illustrates a brazing sheet according to one embodiment. A core layer 12 comprising 3xxx series aluminum alloy has a braze liner 16 on a first side and waterside liner 14 on a second side.

In some embodiments, the core layer comprises: Si 0.5-1.25 wt %, Cu 0.5-1.25 wt %, Mn 0.5-2.0 wt %, Mg up to 0.15 wt %, Cr up to 0.1 wt %, Zn up to 0.1 wt %, Ti 0.1-0.2 wt %, the rest Al and inevitable impurities.

In some embodiments, the waterside liner comprises aluminum alloy comprising Zn 7-20 wt %, Si up to 0.25 wt %, Cu up to 0.1 wt %, Mn up to 0.25 wt %, Mg up to 0.1 wt %, Cr up to 0.1 wt %, and inevitable impurities.

In some embodiments, the braze liner comprises a 4xxx series aluminum alloy.

Figure 2:
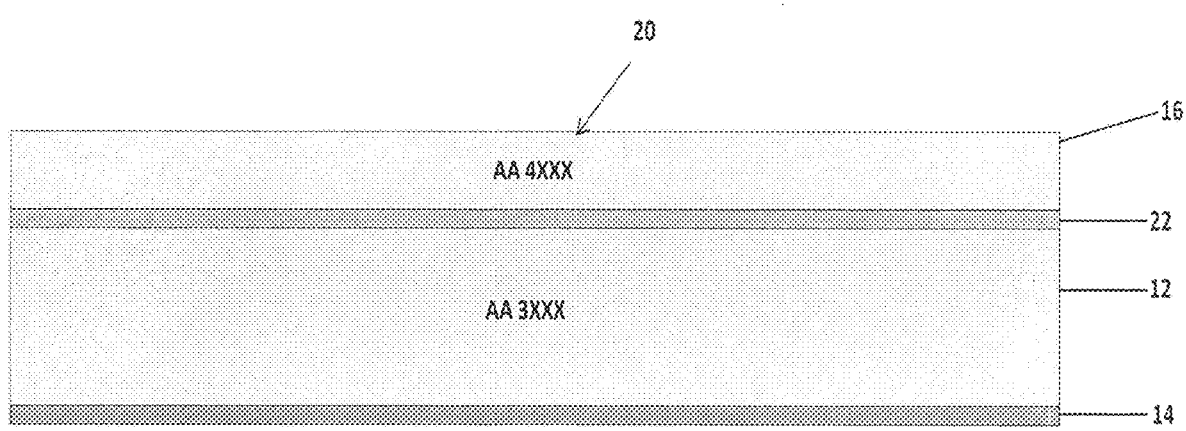
FIG. 2 is a schematic cross-section view of another embodiment of a brazing sheet

FIG. 2 illustrates a brazing sheet according to another embodiment. A second liner 22 is shown between the braze liner 16 and the core layer 12.

Figure 3:
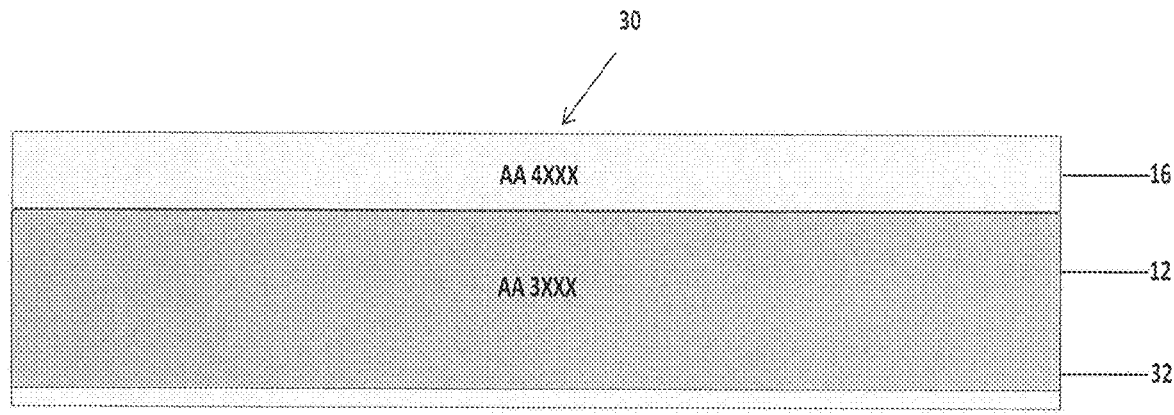
FIG. 3 is a schematic cross-section view of a further embodiment of a brazing sheet.

FIG. 3 illustrates a brazing sheet according to yet another embodiment. A core layer 12 comprising 3xxx series aluminum alloy has a braze liner 16 on a first side and waterside liner 32 on a second side. In this embodiment, the waterside liner can be commercial purity Zn comprising Zn 99.9 wt % and inevitable impurities. The layer can be applied by using a zinc spray process on the second side of the core, using a coating process on the second side of the core, or cast/roll bonding a layer on the second side of the core.

Figure 4:
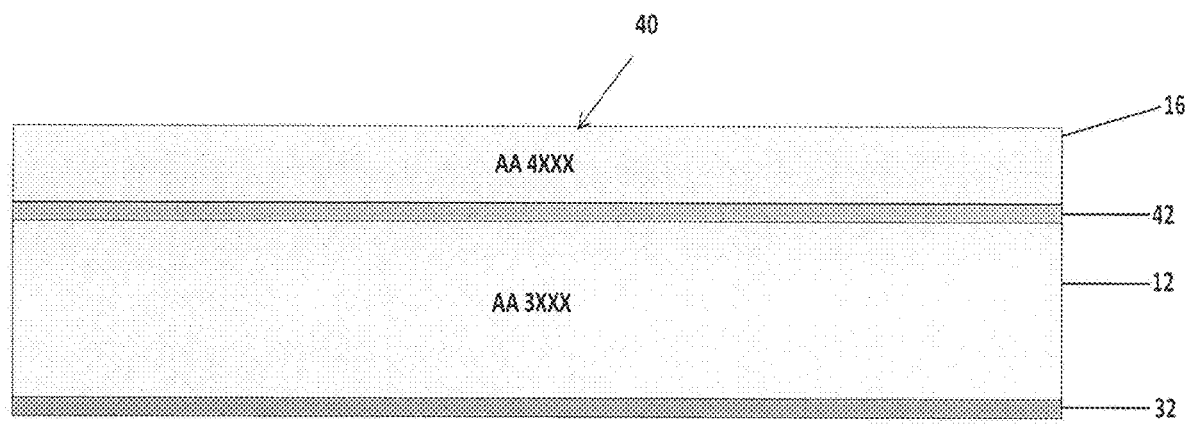
FIG. 4 is a schematic cross-section view of yet another embodiment of a brazing sheet.

The embodiment shown in FIG. 4 includes a second layer of commercial purity zinc 42 between the core layer and the braze liner 16.

In some embodiments of the brazing sheet shown in FIG. 2, the second liner 22 comprises commercial purity (99.9 wt %) zinc.

Since zinc in aluminum lowers the melting point of the Al—Zn alloy there can be a high risk of melting the high zinc containing layer in the braze process before or at a braze temperature around 600 C. However, the zinc in the waterside liner can be redistributed through the fabrication process by diffusing from the waterside liner into the core, which reduces the initial zinc concentration in the waterside liner and, therefore, makes it possible to go through the high temperature brazing process without melting. The fabrication process can be any thermal or mechanical process known in the art to produce brazing sheet, such as annealing, hot rolling and cold rolling. The amount of zinc diffusion that will occur depends on factors known to those of ordinary skill in the art, such the type, time and temperature of processing steps.

Figure 5:
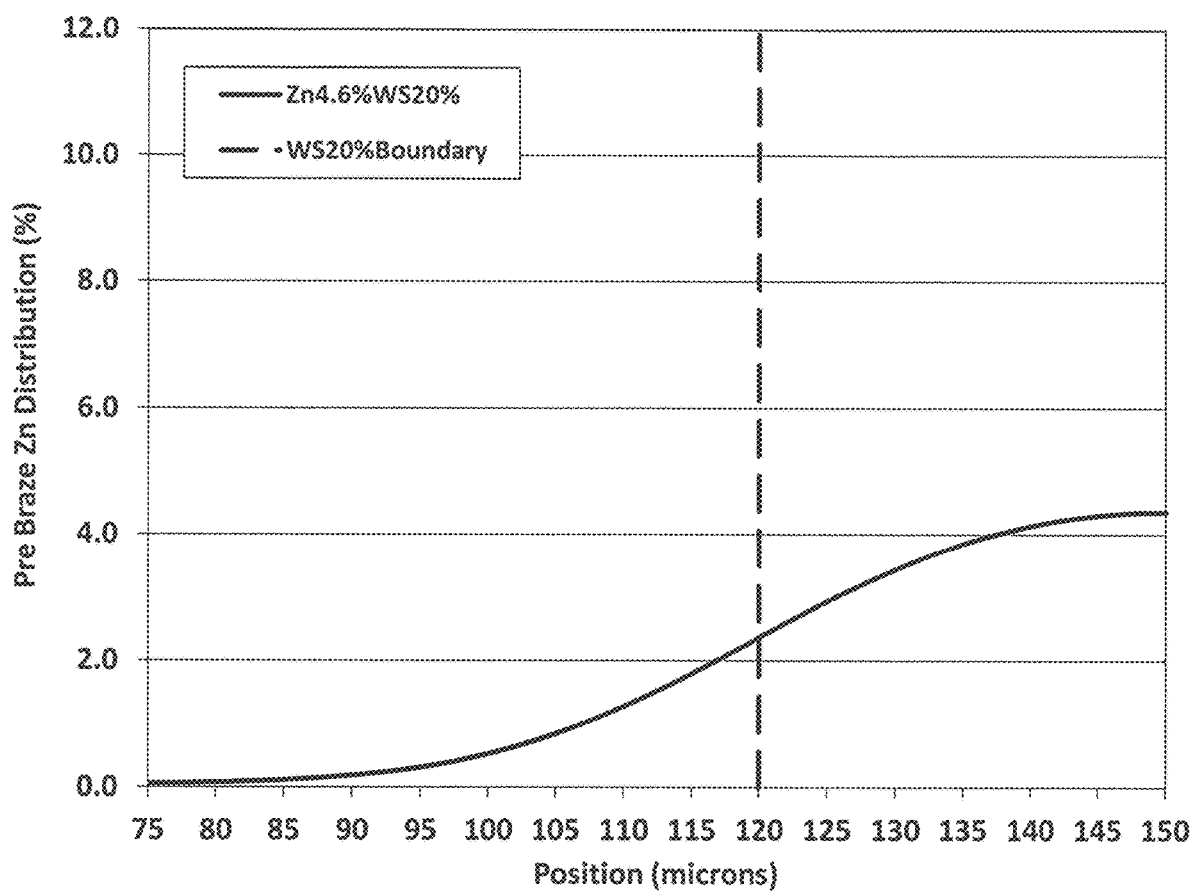
FIG. 5 is a graph illustrating simulated pre-braze zinc distribution according to a prior art brazing sheet.
Figure 6:
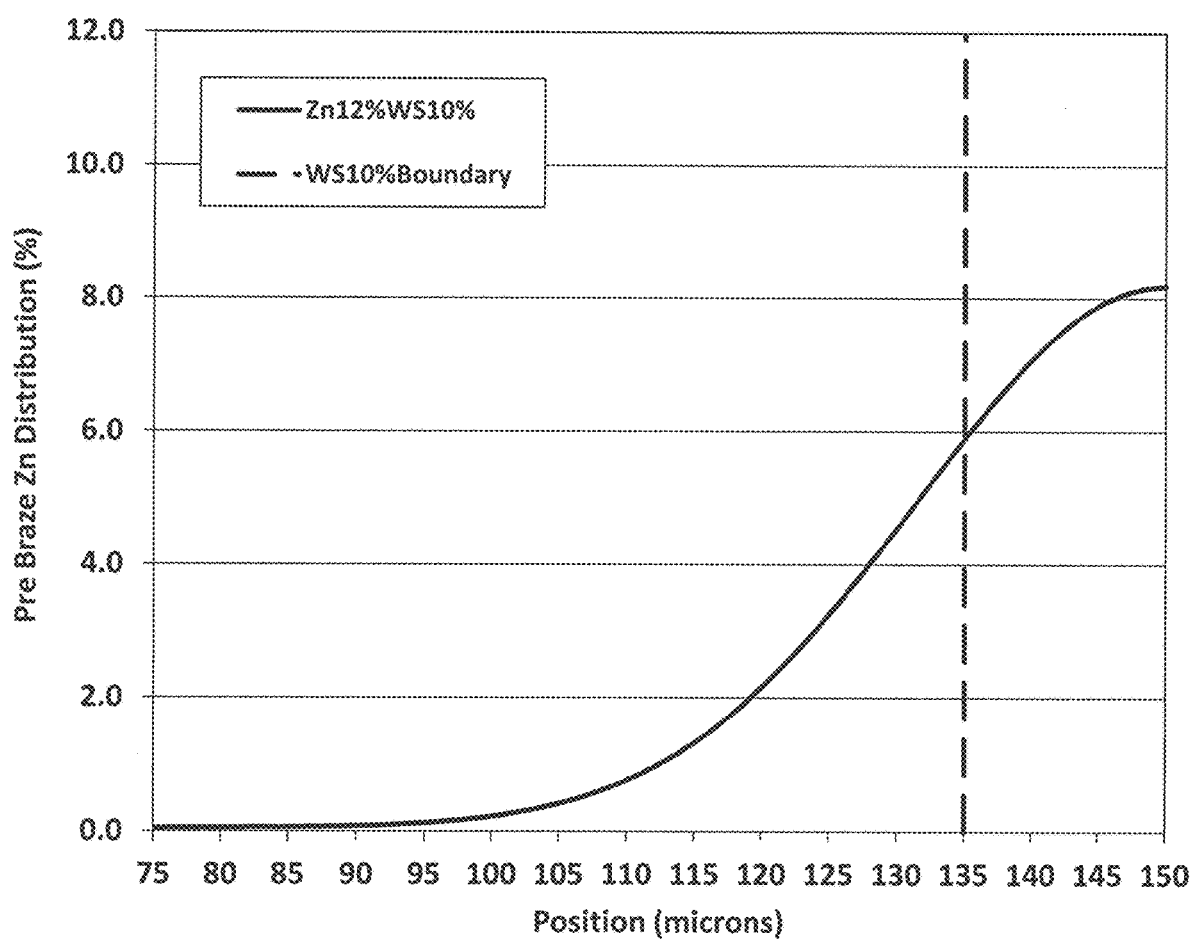
FIG. 6 is a graph illustrating simulated pre-braze zinc distribution according to another embodiment of a brazing sheet.
Figure 7:
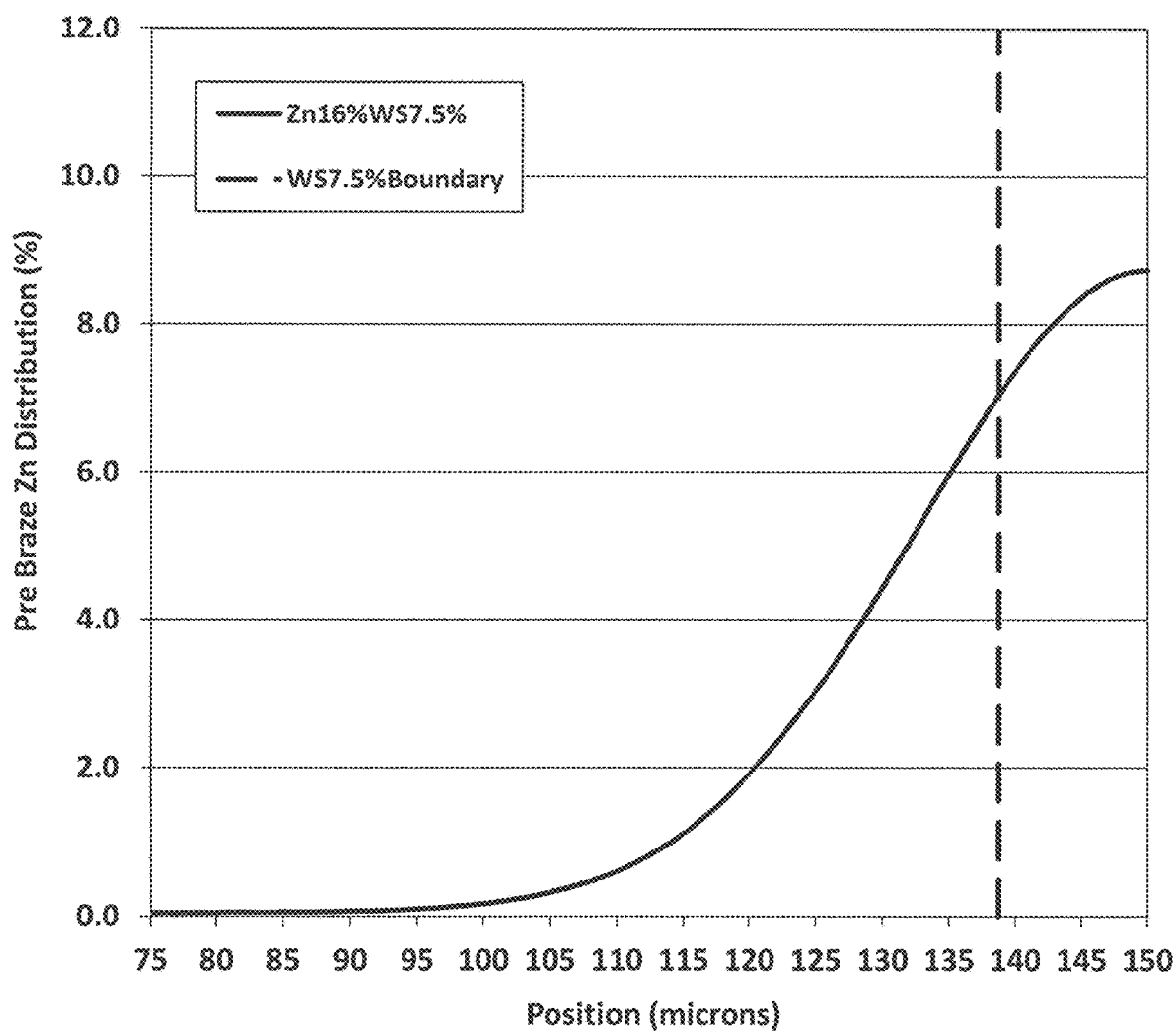
FIG. 7 is a graph illustrating simulated pre-braze zinc distribution according to a further embodiment of a brazing sheet.
Figure 8:
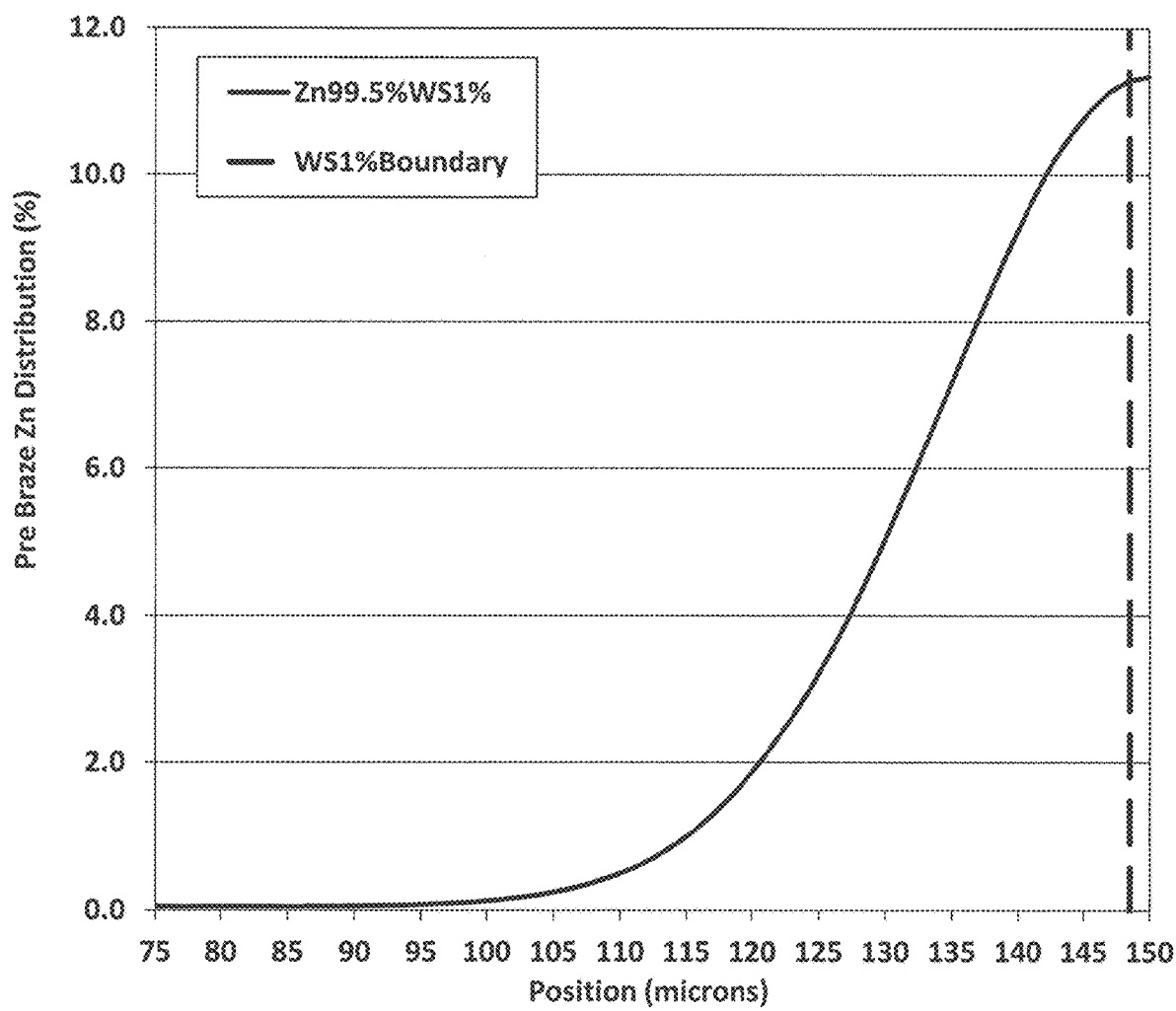
FIG. 8 is a graph illustrating simulated pre-braze zinc distribution according to yet another embodiment of a brazing sheet.
Figure 9:
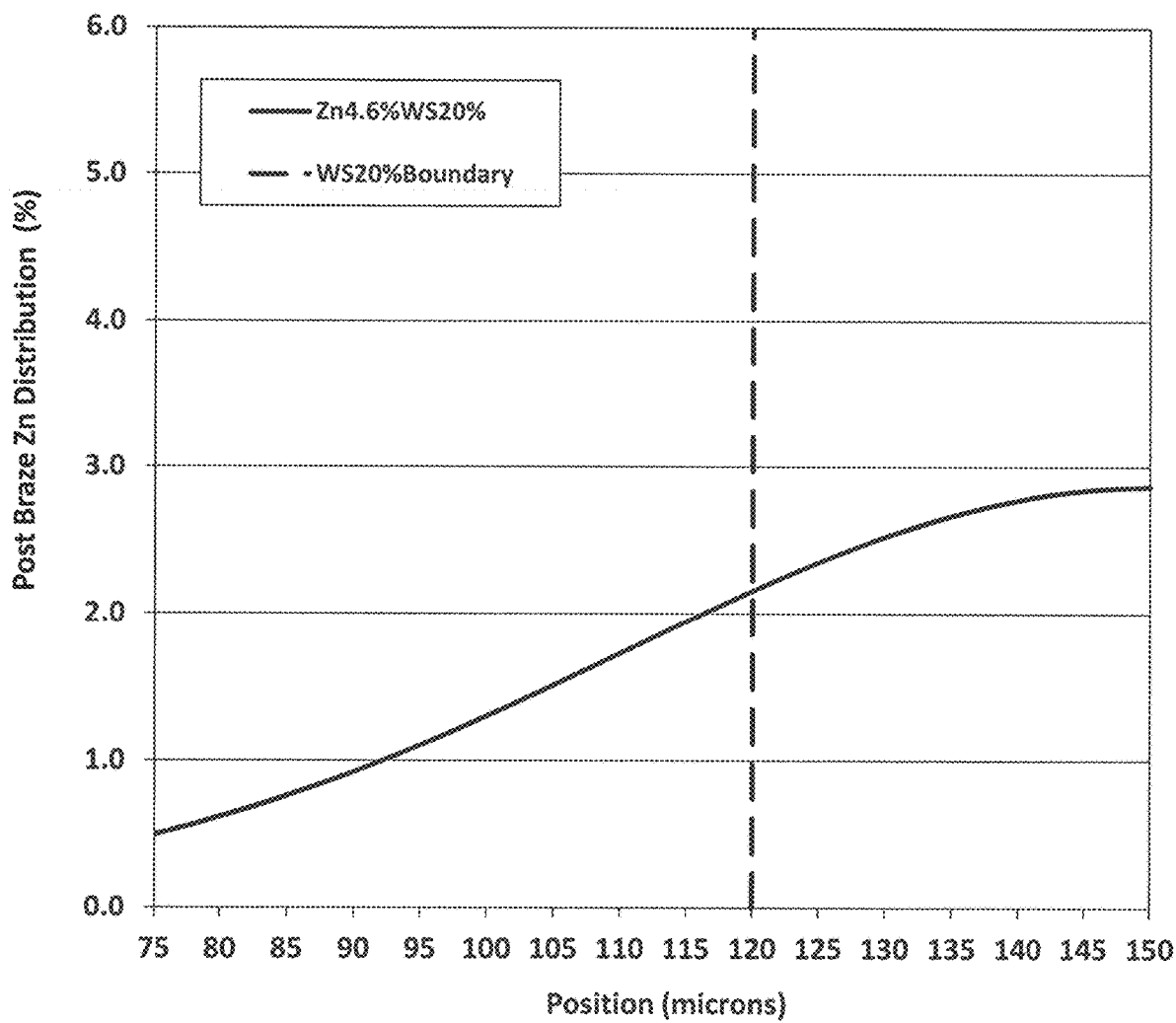
FIG. 9 is a graph illustrating simulated post-braze zinc distribution according to the prior art referenced in FIG. 5.
Figure 10:
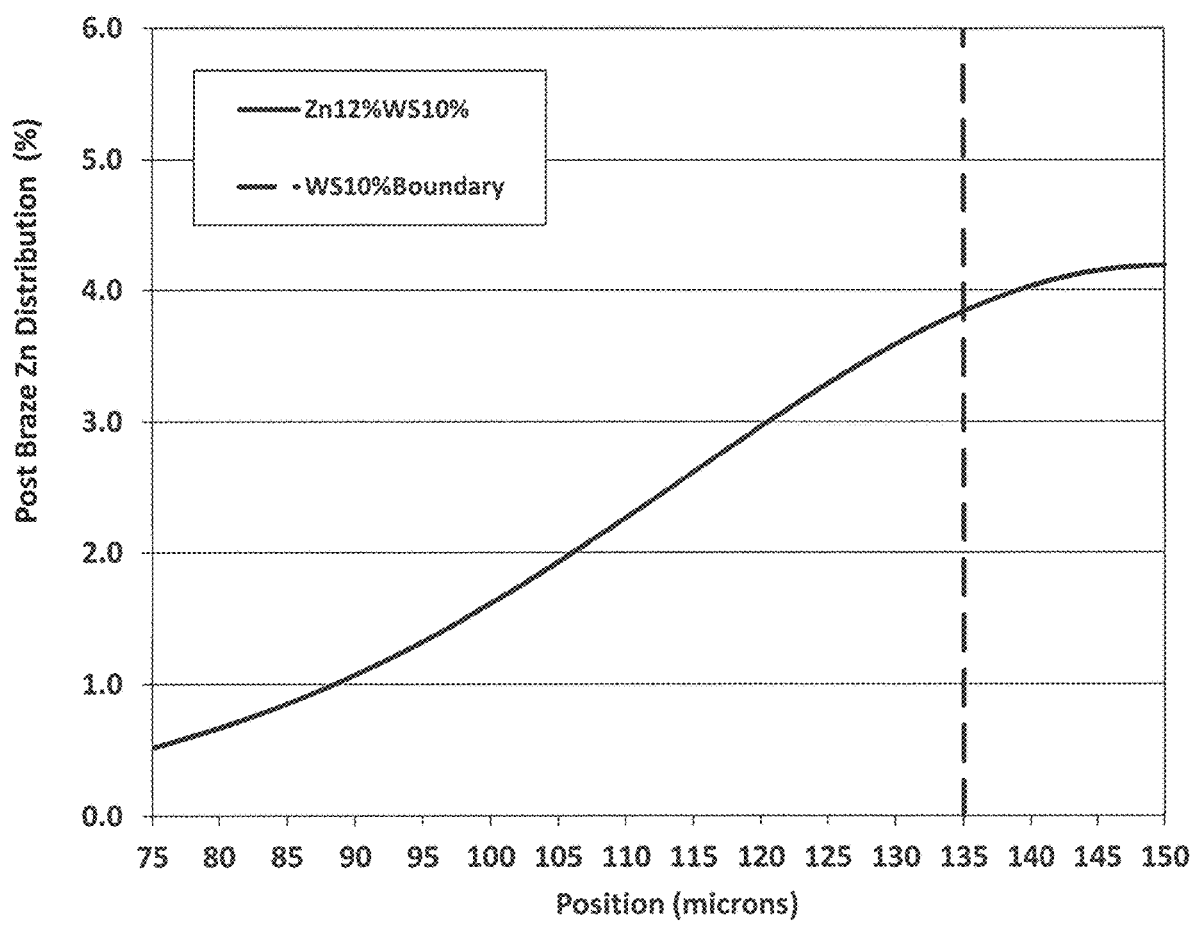
FIG. 10 is a graph illustrating simulated post-braze zinc distribution according to the embodiment referenced in FIG. 6.
Figure 11:
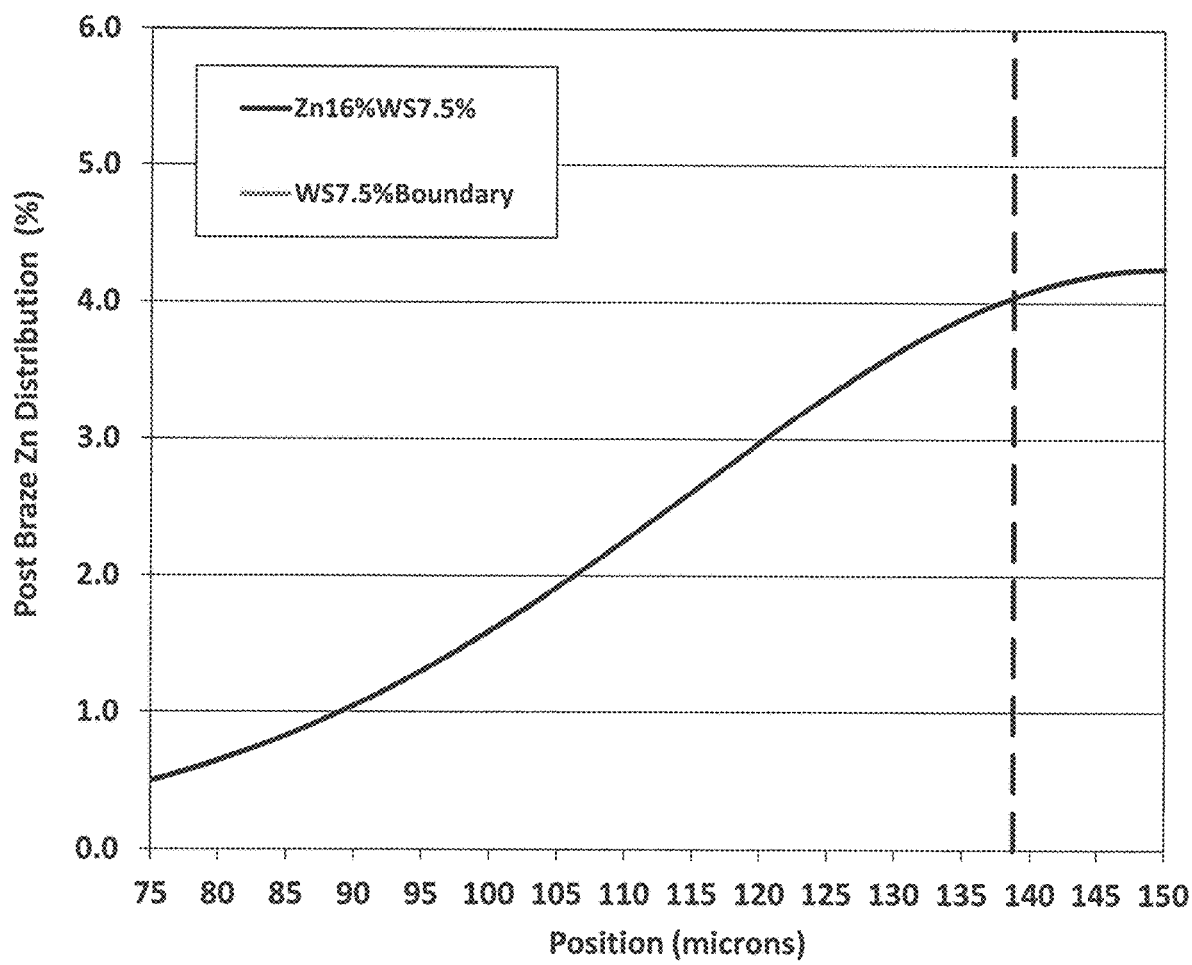
FIG. 11 is a graph illustrating simulated post-braze zinc distribution according to the embodiment referenced in FIG. 7.
Figure 12:
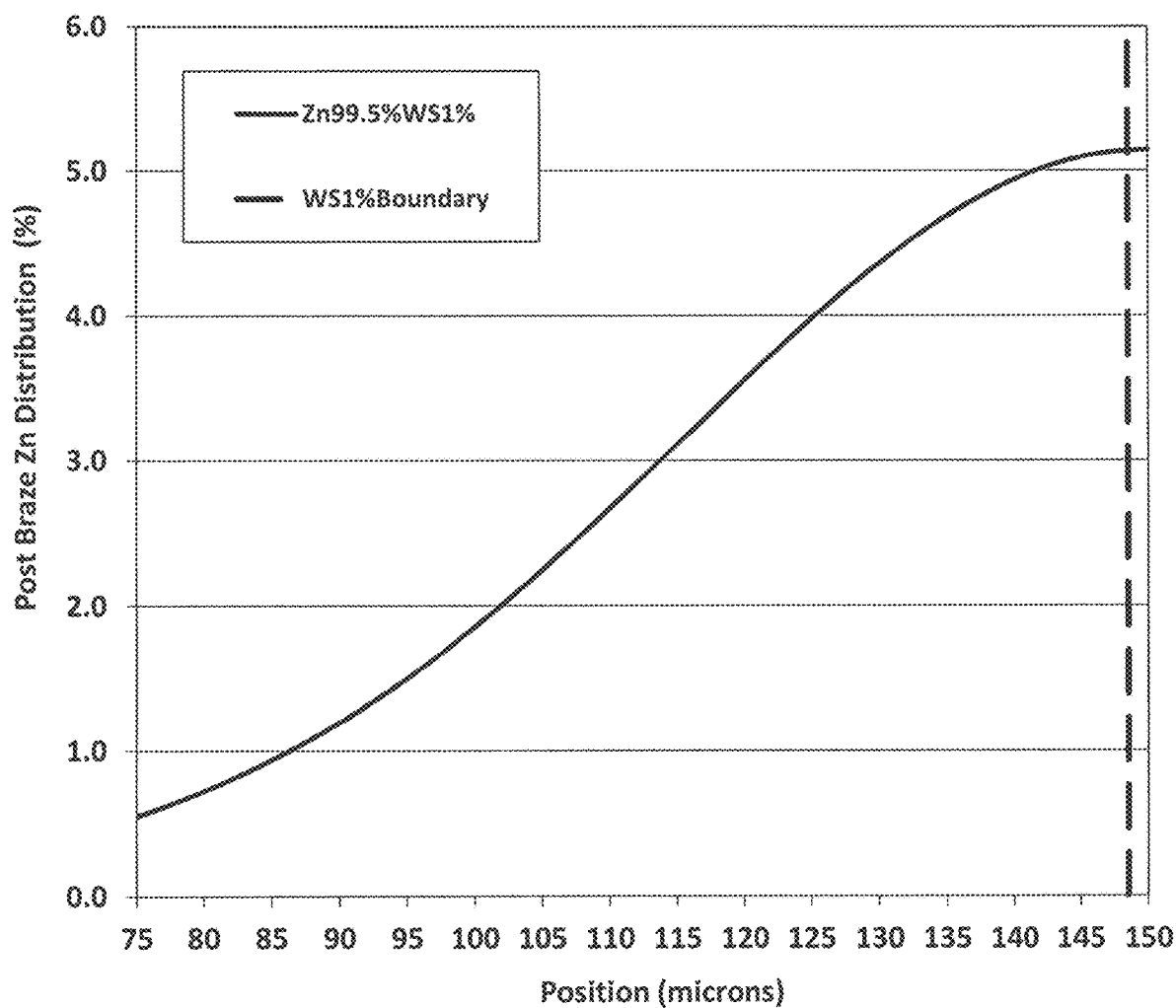
FIG. 12 is a graph illustrating simulated post-braze zinc distribution according to the embodiment referenced in FIG. 8.

Examples of the zinc distribution of a 150 micron brazing sheet according to an embodiment before going through the fabrication process and before brazing are shown in FIGS. 5-8. (The graphs only show from mid thickness of the brazing sheet to the waterside, i.e., 75-150 microns). FIG. 5 illustrates the zinc distribution in a brazing sheet having a prior art waterside liner starting with 4.6 wt % Zn. FIG. 6 illustrates the zinc distribution in a brazing sheet having a waterside liner starting with 12 wt % Zn. FIG. 7 illustrates the zinc distribution in a brazing sheet having a waterside liner starting with 16 wt % Zn. FIG. 8 illustrates the zinc distribution in a brazing sheet having a waterside liner starting with 99.5 wt % Zn. The vertical boundary line in FIGS. 5-8 represents the thickness of the brazing sheet where the core layer ends and the waterside liner begins. The higher the zinc concentration in the waterside liner, the thinner the waterside liner can be while still providing adequate protection to the core. This enables the core to be thicker and provide higher strength to the brazing sheet, while the brazing sheet maintains the same thickness The zinc distributions after braze are shown in FIGS. 9-12. FIG. 9 illustrates the post-braze zinc distribution in a brazing sheet having a prior art waterside liner starting with 4.6 wt % Zn. FIG. 10 illustrates the post-braze zinc distribution in a brazing sheet having a waterside liner starting with 12 wt % Zn. FIG. 11 illustrates the post-braze zinc distribution in a brazing sheet having a waterside liner starting with 16 wt % Zn. FIG. 12 illustrates the post-braze zinc distribution in a brazing sheet having a waterside liner starting with 99.5 wt % Zn.

The difference in zinc level between the liner surface and core are shown in the table in FIG. 13. The zinc levels shown in the Table indicate that initial zinc levels are significantly reduced through thermal and mechanical process, i.e., from 99.5% to 11.345%, 16% to 8.735%, 12% to 8.179%, and 4.6% to 4.357% with the corresponding clad ratio. In this way the risk of melting in the braze process is significantly reduced, which makes it possible to use a high zinc containing alloy for waterside liner application.

The simulated zinc distribution also shows for the high zinc containing liner the low clad ratio can provide larger difference in the zinc level between the liner surface and tube center for the post braze material, which is expected to provide better corrosion protection to a tube formed by brazing sheet according to some embodiments.

Some embodiments provide high strength and enhanced corrosion protection to enable a light gauge product.

Figure 14:
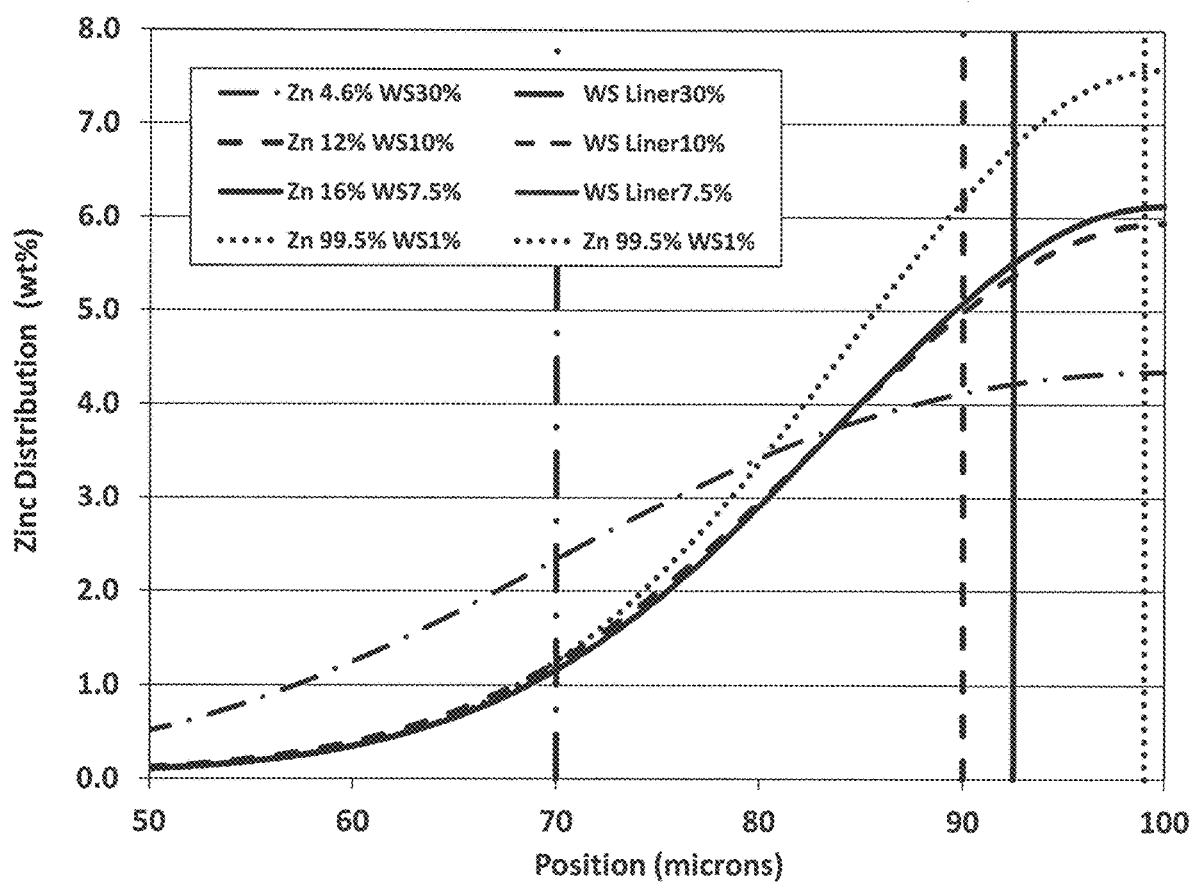
FIG. 14 is a graph showing the simulated pre-braze zinc distributions of four additional embodiments.
Figure 15:
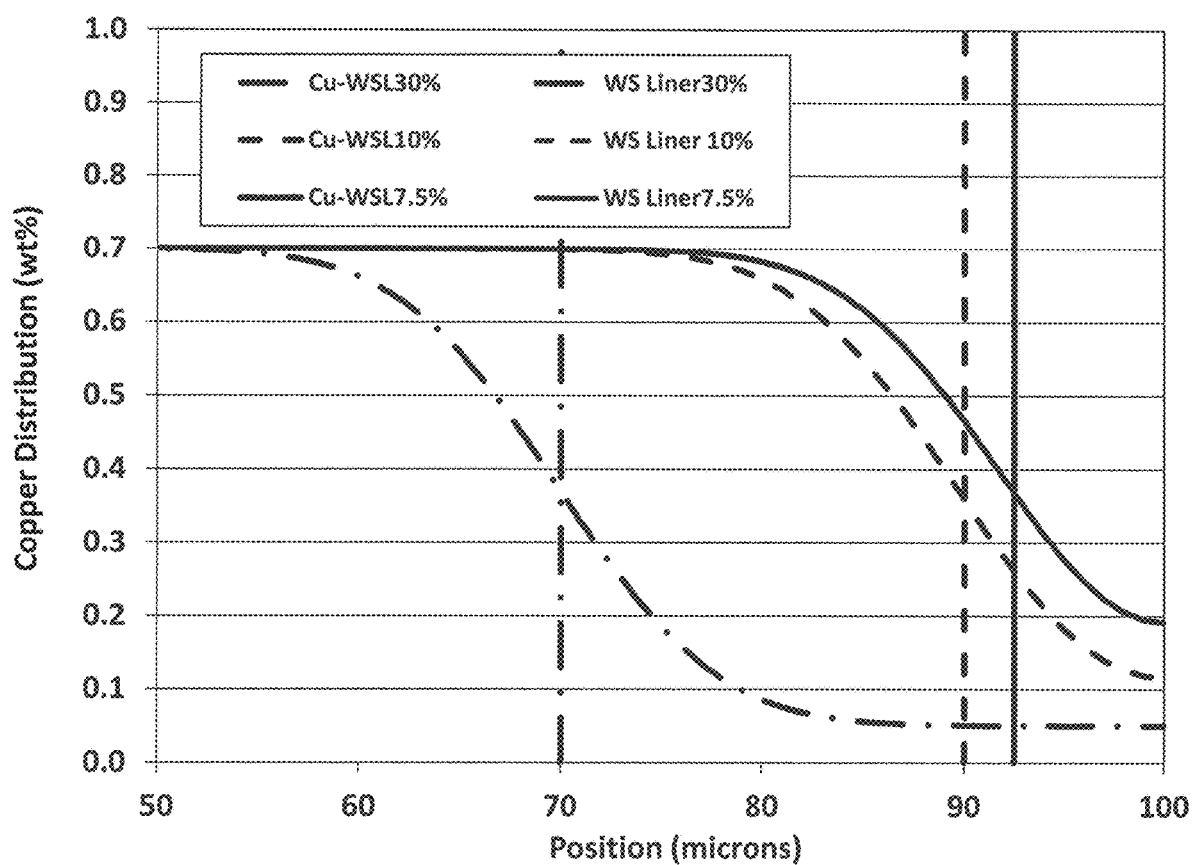
FIG. 15 is a graph showing the simulated pre-braze copper distributions of the four embodiments referenced in FIG. 14.
Figure 16:
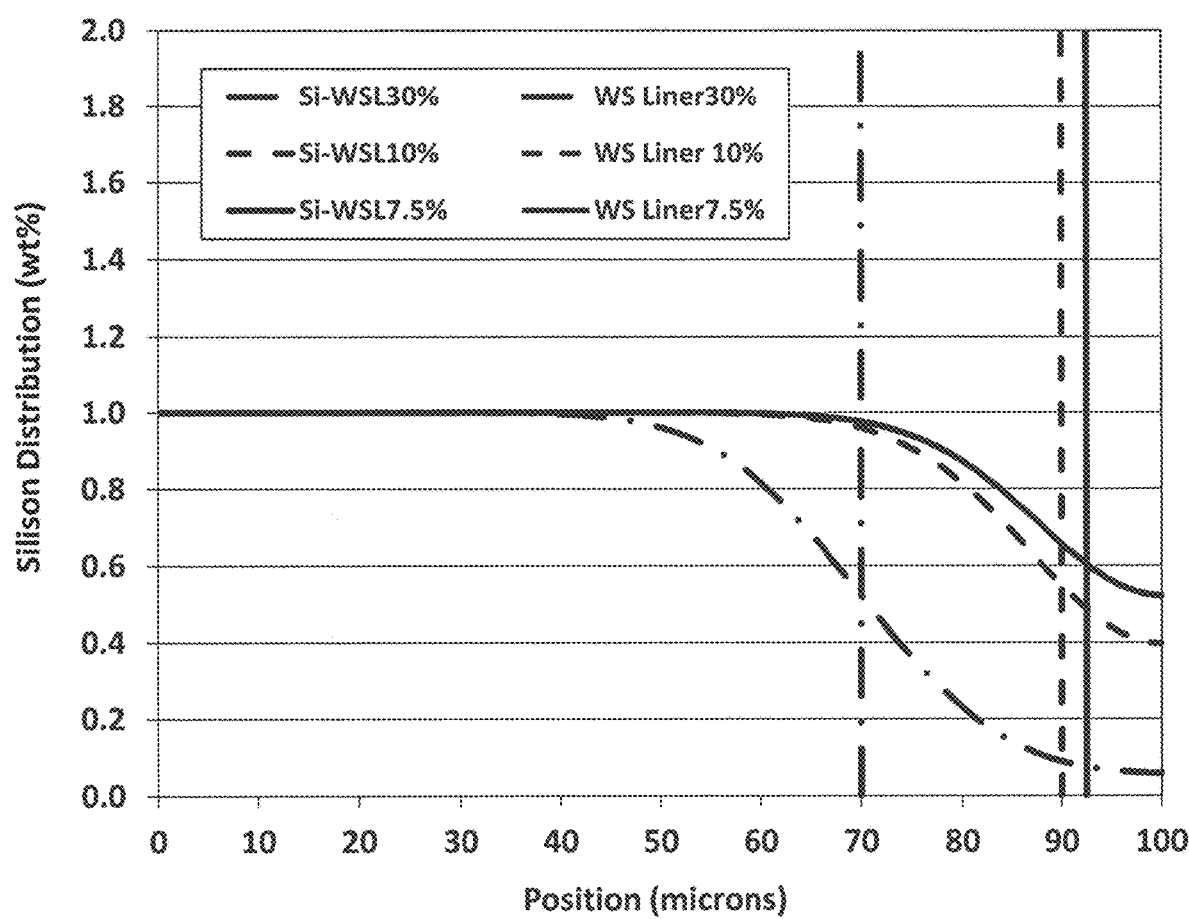
FIG. 16 is a graph showing the simulated pre-braze silicon distributions of the four embodiments referenced in FIG. 14.

In another example, an embodiment of a 100-micron thick brazing sheet is used as an as a radiator/heater core tube. FIGS. 14-16 show the zinc, copper and silicon distributions, respectively, before going through the fabrication process and before brazing. FIG. 14 illustrates the zinc distribution in brazing sheet having waterside liners starting with 4.6 wt % Zn, 12 wt % Zn, 16 wt % Zn, and 99.5 wt % Zn. The waterside liner comprises 30% of the thickness of the brazing sheet having a waterside liner starting with 4.6 wt % Zn (prior art). The waterside liner comprises 10% of the thickness of the brazing sheet having a waterside liner starting with 12 wt % Zn. The waterside liner comprises 7.5% of the thickness of the brazing sheet having a waterside liner starting with 16 wt % Zn. The waterside liner comprises 1% of the thickness of the brazing sheet having a waterside liner starting with 99.9 wt % Zn.

FIG. 15 illustrates the copper distribution in brazing sheet having waterside liners starting with 4.6 wt % Zn, 12 wt % Zn, and 16 wt % Zn. FIG. 16 illustrates the silicon distribution in brazing sheet having a waterside liners starting with 4.6 wt % Zn, 12 wt % Zn, and 16 wt % Zn.

Figure 17:
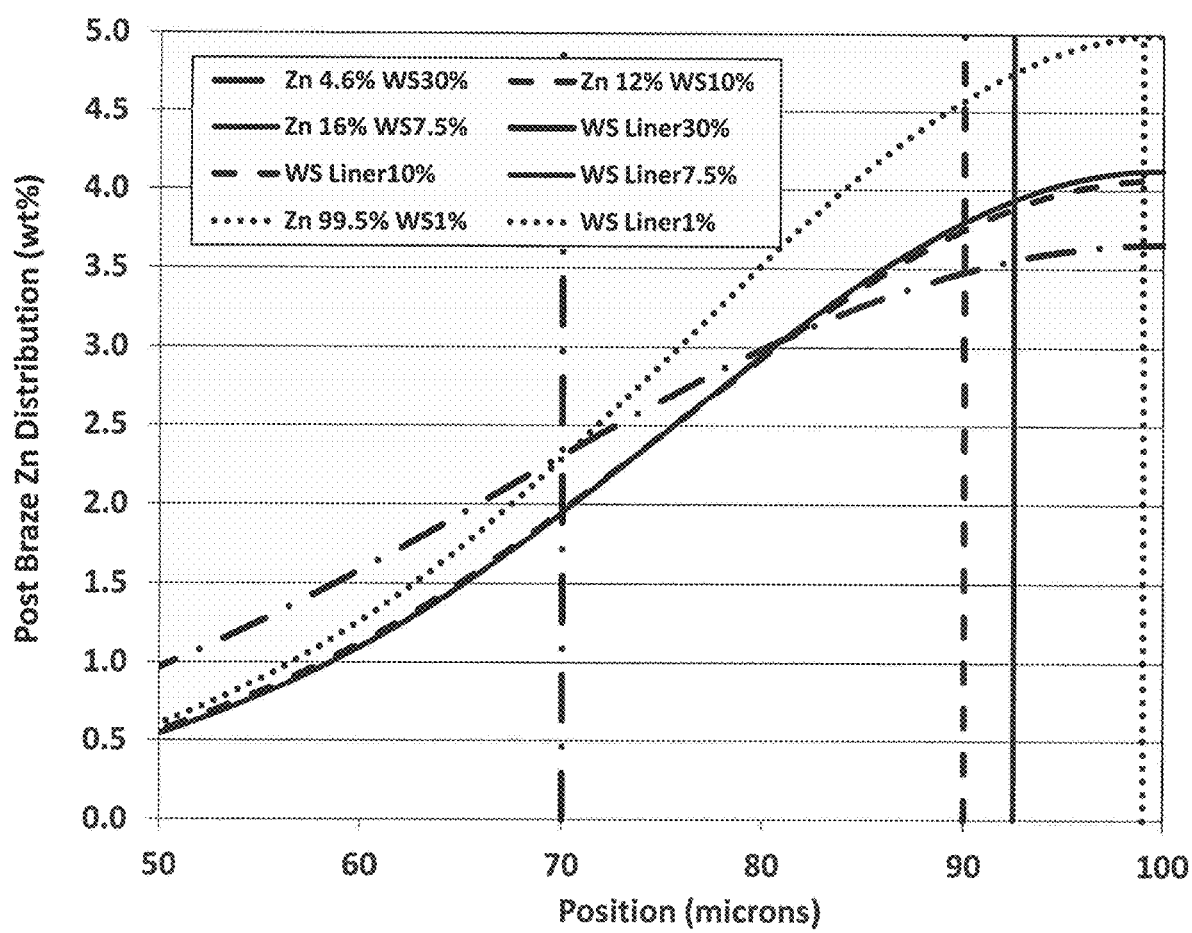
FIG. 17 is a graph showing the simulated post-braze zinc distributions of the four embodiments referenced in FIG. 14.
Figure 18:
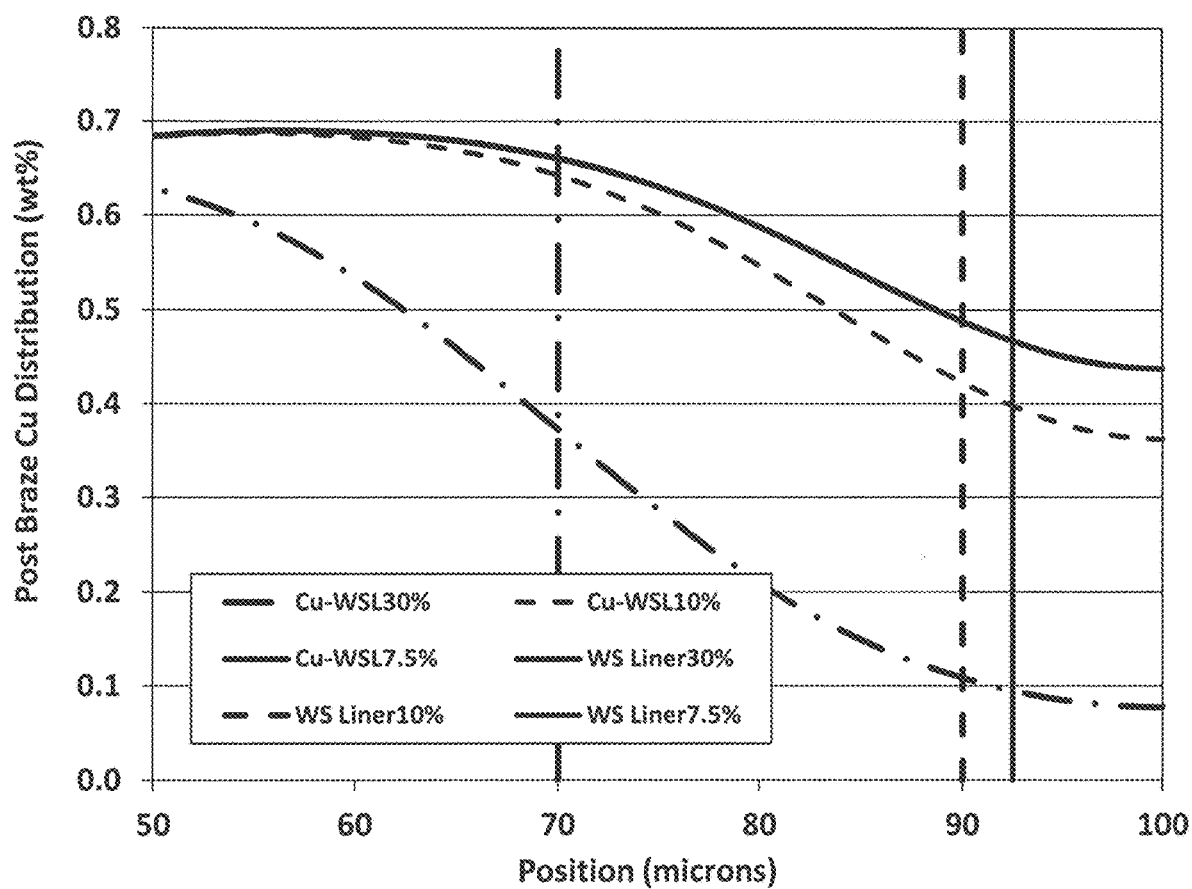
FIG. 18 is a graph showing the simulated post-braze copper distributions of the four embodiments referenced in FIG. 14.
Figure 19:
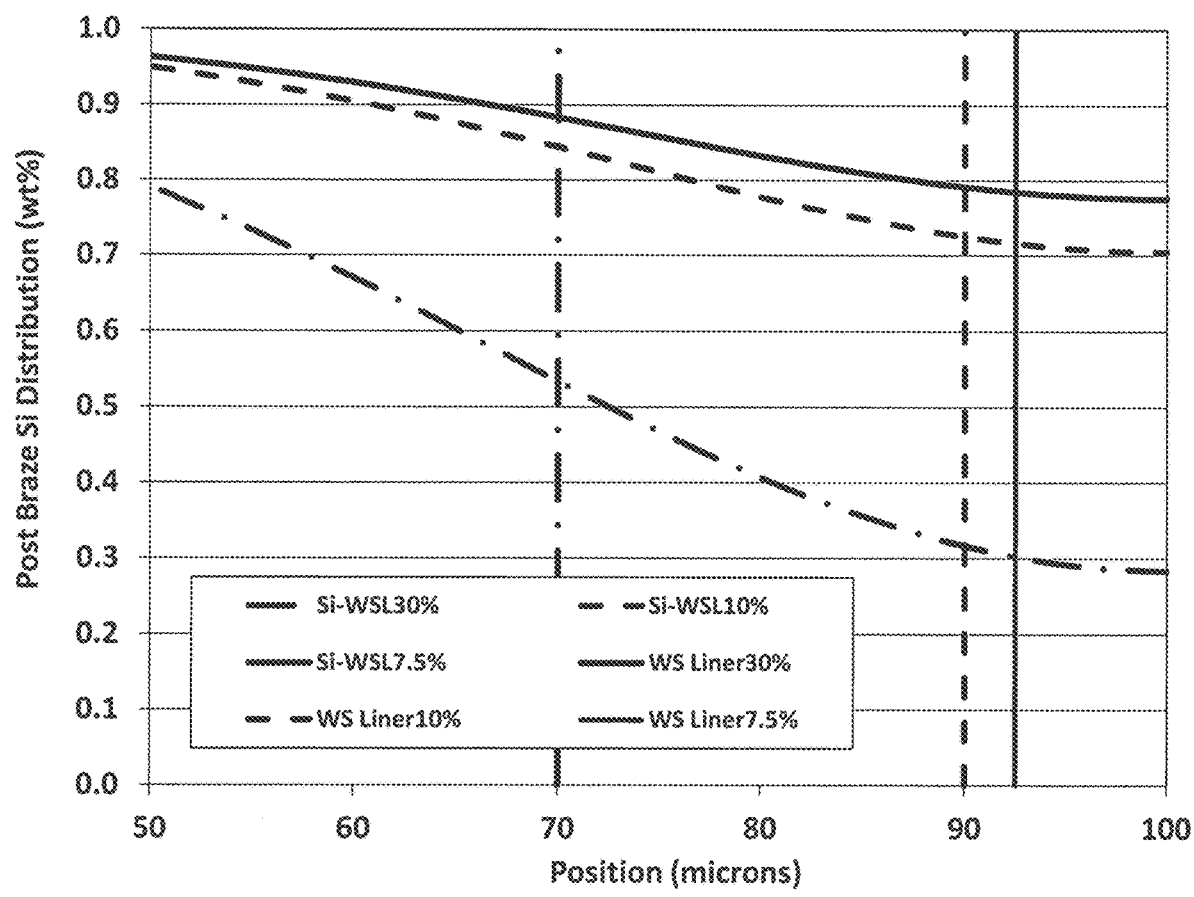
FIG. 19 is a graph showing the simulated post-braze silicon distributions of the four embodiments referenced in FIG. 14.

The alloying element distributions of the post braze material are shown in the graphs in FIGS. 17-19. FIG. 17 illustrates the zinc distribution, FIG. 18 illustrates the copper distribution and FIG. 19 illustrates the silicon distribution.

The vertical lines in FIGS. 14-19 represent the thickness of the brazing sheet where the core layer ends and the waterside liner begins.

Four liner thicknesses with four zinc levels are shown FIGS. 14-19. With a high zinc level, a low clad ratio can be used to provide sufficient corrosion protection for a tube formed with the brazing sheet according to some embodiments.

The above diffusion simulations show waterside liners with relatively higher zinc levels and lower clad ratios can generate larger differences in zinc concentrations between the surface of the waterside liner and core than waterside liners with relatively low zinc levels and higher clad ratios. The larger differences in zinc concentrations can provide better corrosion protection to the core. A low clad ratio enables a high core thickness, which can help increase the strength of the tube material.

In some embodiments, a zinc-containing liner, comprising one of the alloys disclosed above, is on the first side of the core, between the braze liner and core, to provide the corrosion protection on the air side of the brazing sheet.

Figure 20:
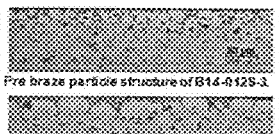
FIG. 20 shows properties of two embodiments of brazing sheet.

FIG. 20 shows properties of a lab made heater core tube made from brazing sheet according to two embodiments. Both embodiments had a thickness of about 0.1 mm. the clad ration of the braze liner was about 20% and the clad ratio of the waterside liner was about 11% The braze liner in both embodiments was comprised of the same alloy. The water side liner in both embodiments was comprised of the same alloy. Two different core alloys were tested.

Figure 21:
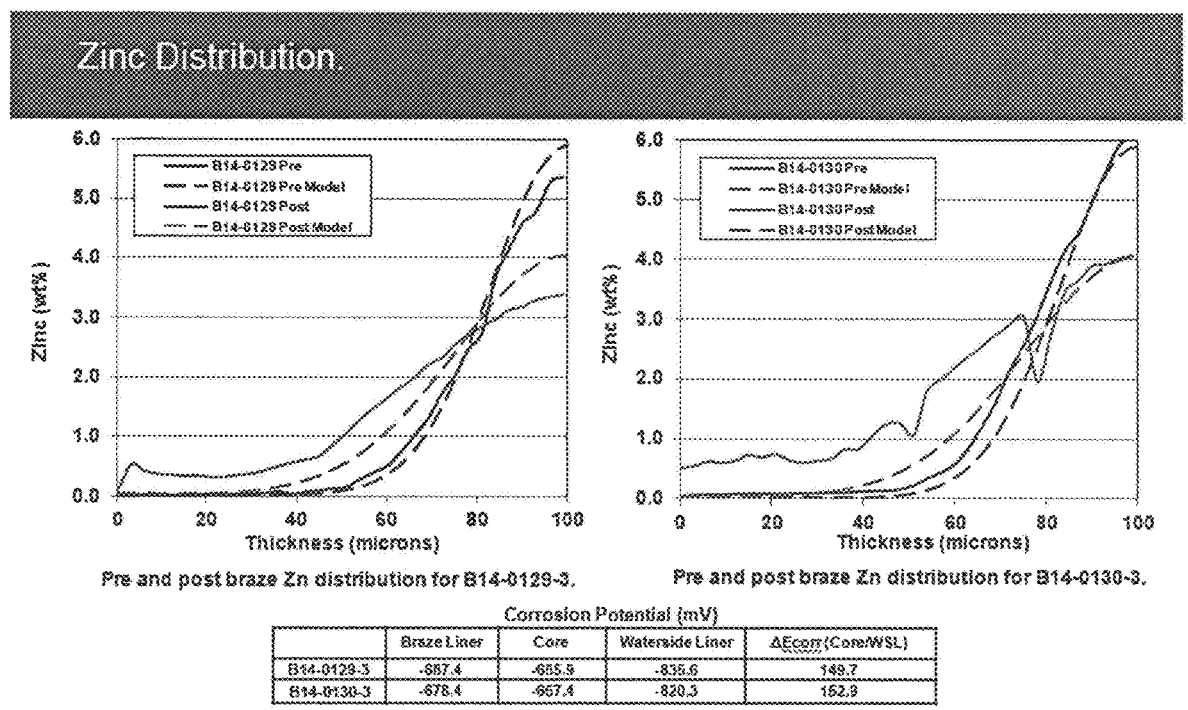
FIG. 21 shows the zinc distributions of the two embodiments detailed in FIG. 21.

FIG. 21 shows the zinc distributions of the two embodiments detailed in FIG. 21. With respect to both embodiments, the zinc diffused into the core in the fabrication process, but the gradient of the zinc diffusion is still steep. The difference between the zinc level in the waterside liner and the core is significant and generates a good corrosion potential difference such that the water side liner can provide adequate corrosion protection to the core in both embodiments.

Figure 22:
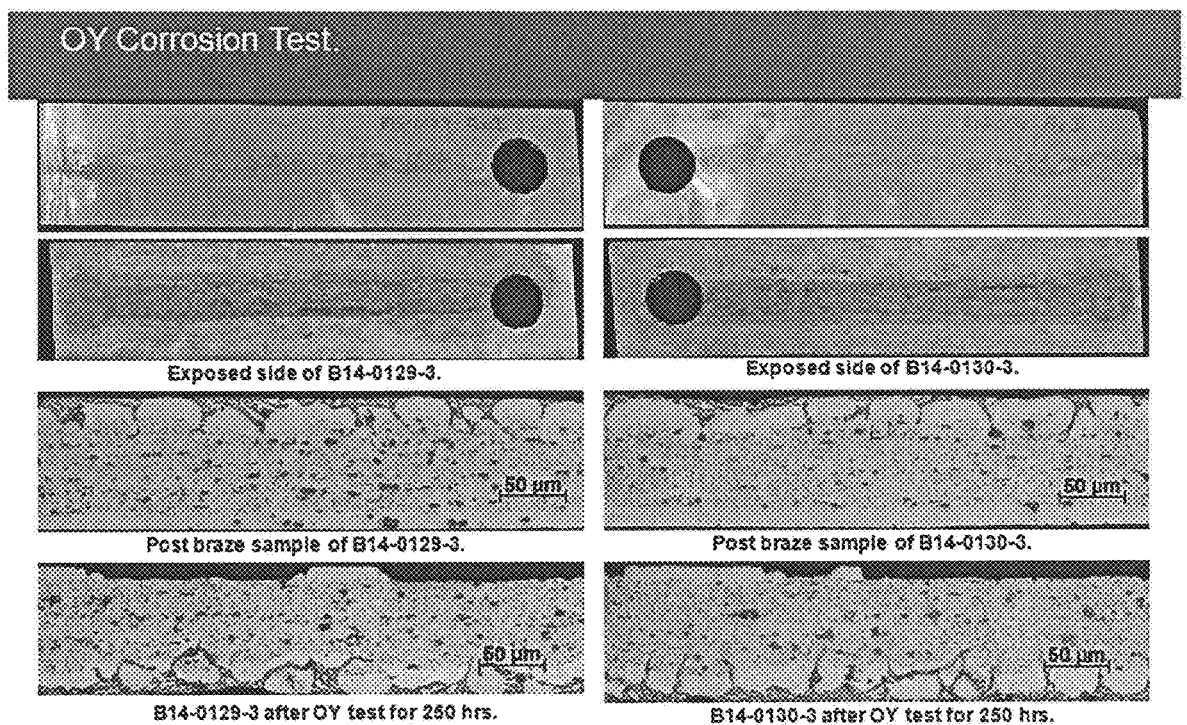
FIG. 22 shows the results of an OY corrosion test on the two embodiments detailed in FIG. 21.

Results of an OY corrosion test are shown in FIG. 22. The sample shown had gone through the OY corrosion test for 250 hours. The OY test temperature was 95 C and a flow rate of about 1 liter per minute. The OY solution composition was as follows:

| Chemical product | Required quantity for one liter of OY water |
|---|---|
| NaCl | 225.50 mg |
| $Na_2SO_4$ | 89.00 mg |
| $CuCl_2 \cdot 2H_2O$ | 2.65 mg |
| $FeCl_3 \cdot 6H_2O$ | 145.00 mg |
| Total $Cl^-$ | 195 ppm |

Figure 23:
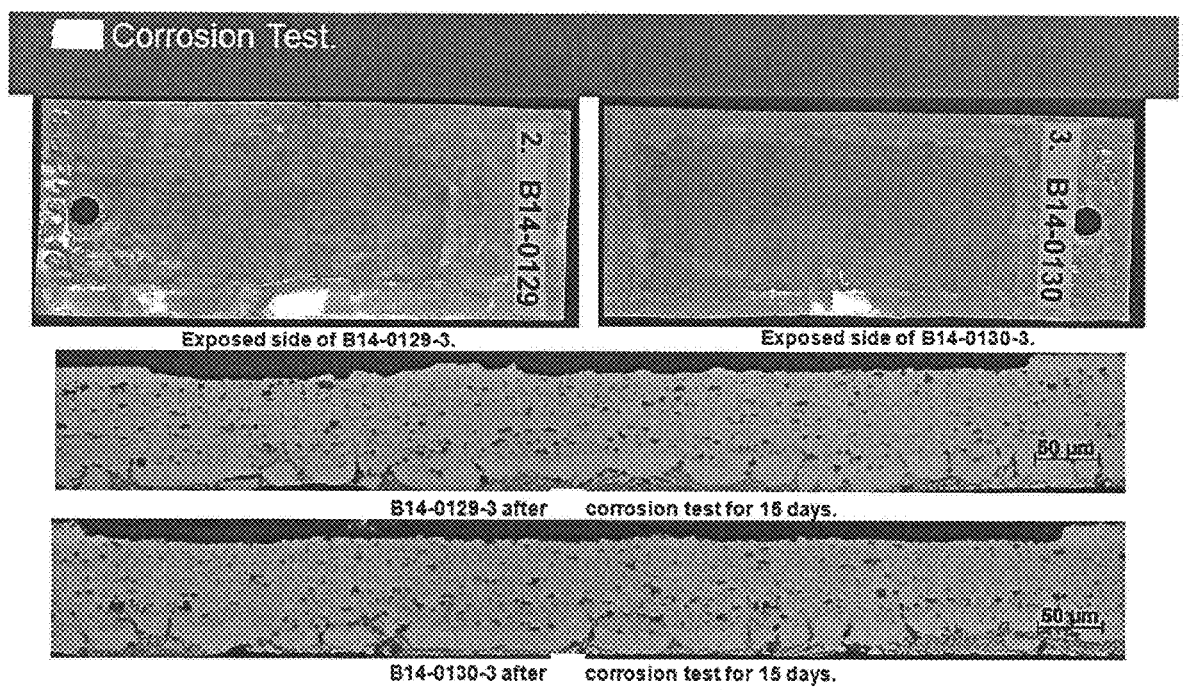
FIG. 23 shows samples according to both embodiments shown and described in FIGS. 21 and 22 after completing an immersion test.

FIG. 23 shows samples according to both embodiments shown and described in FIGS. 21 and 22 after completing an immersion test. The corrosion attack is on the water side liner only. The core did not corrode.

Figure 24:
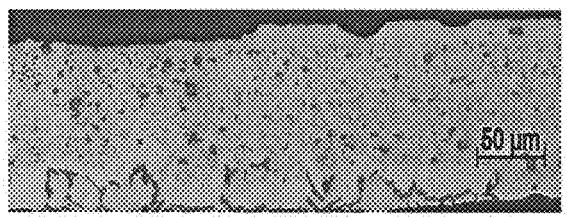
FIG. 24 shows the samples of FIG. 23 after completing the immersion test for 60 days.
Figure 24:
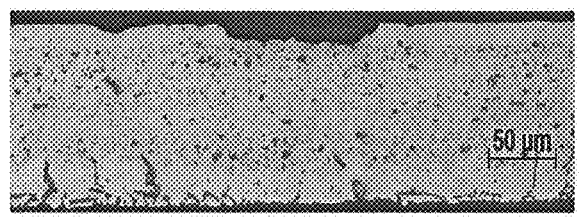

FIG. 24 shows the samples of FIG. 23 after completing the immersion test for 60 days.

A brazing sheet is a metal sheet having multiple, distinct layers, including at least one brazing liner or layer.

A braze liner is a layer of a brazing sheet comprising a brazing material.

A core layer is a layer of a brazing sheet. The core layer has a first side and a second side. A braze liner is on a first side or both sides of the core layer. The braze liner may be directly on the core layer or there may be an interliner between the core and the braze liner.

A waterside liner is a layer of a brazing sheet on one side of the core layer. The purpose of the waterside liner is to protect the core from corrosion cause by coolant flowing through the inside of a tube made from the brazing sheet.

As used herein, "incidental elements" means those elements or materials that may optionally be added to the alloy to assist in the production of the alloy. Examples of incidental elements include casting aids, such as grain refiners.

Grain refiners are inoculants or nuclei to seed new grains during solidification of the alloy. An example of a grain refiner is a 9.5 mm (⅜ inch) rod comprising 96% aluminum, 3% titanium (Ti) and 1% boron (B), where virtually all boron is present as finely dispersed TiB2 particles. During casting, the grain refining rod is fed in-line into the molten alloy flowing into the casting pit at a controlled rate. The amount of grain refiner included in the alloy is generally dependent on the type of material utilized for grain refining and the alloy production process. Examples of grain refiners include Ti combined with B (e.g., TiB2) or carbon (TiC), although other grain refiners, such as Al—Ti master alloys may be utilized. Generally, grain refiners (e.g., boron) may be added to the alloy in an amount of ranging from 0.0003 wt % to 0.03 wt. %, depending on the desired as-cast grain size. In addition, Ti may be separately added to the alloy in an amount up to 0.03 wt. % to increase the effectiveness of grain refiner. When Ti is included in the core alloy, it is generally present in an amount of up to about 0.10 or 0.20 wt. %.

Incidental elements may be present in minor amounts, or may be present in significant amounts, and may add desirable or other characteristics on their own without departing from the alloy described herein, so long as the alloy retains the desirable characteristics described herein. It is to be understood, however, that the scope of this disclosure should not/cannot be avoided through the mere addition of an element or elements in quantities that would not otherwise impact on the combinations of properties desired and attained herein.

As used herein, impurities are those materials that may be present in the alloy in minor amounts due to, for example, the inherent properties of aluminum and/or leaching from contact with manufacturing equipment. Iron (Fe) is an example of an impurity generally present in aluminum alloys. The Fe content of the alloy should generally not exceed about 0.25 wt. %. In some embodiments, the Fe content of the alloy is not greater than about 0.15 wt. %, or not greater than about 0.10 wt. %, or not greater than about 0.08 wt. %, or not greater than about 0.05 wt. % or about 0.04 wt. %.

The alloys and tempers mentioned herein are as defined by the American National Standard Alloy and Temper Designation System for Aluminum ANSI H35.1 and "the Aluminum Association International Alloy Designations and Chemical Composition Limits for Wrought Aluminum and Wrought Aluminum Alloys as revised January 2015.

Except where stated otherwise, the expression "up to" when referring to the amount of an element means that that elemental composition is optional or incidental and includes a zero amount of that particular compositional component. Unless stated otherwise, all compositional percentages are in weight percent (wt. %).

I claim:

1. A brazing sheet comprising:
   a. a core layer comprising:
   i. a 3xxx series aluminum alloy;
   ii. a first side;
   iii. a second side;
   b. a braze liner on the first side of the core layer; and
   c. a waterside liner on the second side of the core layer, wherein the waterside liner is an aluminum alloy comprising in a first pre-braze state before thermo-mechanical processing
   7-20 wt. % Zn and
   up to 0.1 wt. % Cu, the brazing sheet having been thermo-mechanically processed to diffuse a portion of the Zn in the waterside liner into the core resulting in a second pre-braze state, the portion of the Zn diffused adapted to provide a solidus of the core and the waterside liner ≥600° C., a total thickness ≥0.06 mm and <0.20 mm and a post-braze Zn concentration difference of >2.2% between a central position within the thickness of the brazing sheet and a surface of the waterside liner, distal to the core.

2. The brazing sheet of claim 1 wherein the waterside liner comprises 10-20 wt. % Zn.

3. The brazing sheet of claim 1 wherein the waterside liner comprises 12-20 wt. % Zn.

4. The brazing sheet of claim 1 wherein the waterside liner comprises 9-12 wt. % Zn.

5. The brazing sheet of claim 1 wherein the core layer comprises one or more of:
   a. 0.5-1.25 wt. % Si;
   b. 0.5-1.25 wt. % Cu;
   c. 0.5-2.0 wt. % Mn;
   d. up to 0.15 wt. % Mg;
   e. up to 0.1 wt. % Cr;
   f. up to 0.1 wt. % Zn; and
   g. 0.1-0.2 wt. % Ti.

6. The brazing sheet of claim 1 wherein the brazing sheet has a thickness of 60-180 microns.

7. The brazing sheet of claim 1 wherein the brazing sheet has a thickness of 60-150 microns.

8. The brazing sheet of claim 1 wherein the brazing sheet has a thickness of 80-150 microns.

9. The brazing sheet of claim 1 wherein the brazing sheet has a thickness of 60-100 microns.

10. The brazing sheet of claim 1 wherein the brazing sheet has a thickness and the waterside liner comprises 7-15% of the thickness.

11. The brazing sheet of claim 1 wherein the brazing sheet has a thickness and the waterside liner comprises 7-10% of the thickness.

12. The brazing sheet of claim 1 wherein the brazing sheet has a thickness and the waterside liner comprises 5-15% of the thickness.

13. The brazing sheet of claim 1 wherein the brazing sheet has a thickness and the waterside liner comprises 5-10% of the thickness.

14. A brazing sheet comprising:
   a. a core layer comprising:
   i. a 3xxx series aluminum alloy;
   ii. a first side;
   iii. a second side;
   b. a braze liner on the first side of the core layer; and
   c. a waterside liner on the second side of the core layer, wherein the waterside liner is an aluminum alloy comprising:
   i. ≥16 wt. % Zn;
   ii. up to 0.25 wt. % Si;
   iii. up to 0.1 wt. % Cu;
   iv. up to 0.25 wt. % Mn; and
   v. up to 0.1 wt. % Mg
   the brazing sheet having a total thickness between 60 microns to 180 microns.

* * * * *